(12) United States Patent
Lange et al.

(10) Patent No.: US 6,545,263 B2
(45) Date of Patent: Apr. 8, 2003

(54) SCANNING PROBE MICROSCOPE WITH PROBE INTEGRATED IN AN OPTICAL SYSTEM

(75) Inventors: Ralph Lange, Jena (DE); Torsten Antrack, Jena (DE); Martin Voelcker, Koenigsbronn-Zang (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/187,631

(22) Filed: Nov. 6, 1998

(65) Prior Publication Data

US 2002/0139923 A1 Oct. 3, 2002

(30) Foreign Application Priority Data

Sep. 14, 1998 (DE) .......................... 198 41 931

(51) Int. Cl.⁷ .............................. H01J 3/14; G02B 21/06
(52) U.S. Cl. ...................... 250/234; 250/216; 250/306; 73/105
(58) Field of Search ................................ 250/306, 307, 250/216, 234, 235, 227.11, 227.2, 227.26, 227.28; 73/105

(56) References Cited

U.S. PATENT DOCUMENTS

| | | | | |
|---|---|---|---|---|
| 4,914,293 A | * | 4/1990 | Hayashi et al. | 250/306 |
| 5,247,186 A | * | 9/1993 | Toda | 250/307 |
| 5,272,330 A | * | 12/1993 | Betzig et al. | 250/216 |
| 5,276,324 A | * | 1/1994 | Ohtaki et al. | 250/306 |
| 5,508,517 A | * | 4/1996 | Onuki et al. | 250/306 |
| 5,770,855 A | * | 6/1998 | Fischer | 250/306 |
| 5,939,709 A | * | 8/1999 | Ghislain et al. | 250/234 |
| 5,952,562 A | * | 9/1999 | Yagi et al. | 250/308 |
| 6,127,681 A | * | 10/2000 | Sato et al. | 250/306 |

* cited by examiner

Primary Examiner—Stephone Allen
(74) Attorney, Agent, or Firm—Reed Smith LLP

(57) ABSTRACT

An illumination device for a light microscope comprises a scanning microscope probe which is integrated in the center thereof. A scanning probe microscope comprising such illumination device is also disclosed.

5 Claims, 2 Drawing Sheets

Light-microscope imaging of specimen and SNOM probe.
The illumination is carried out by a construction according to the invention.
(Objective: 100x, NA 1.3 / oil, SNOM condenser: 0.5 - 0.8 bright field).

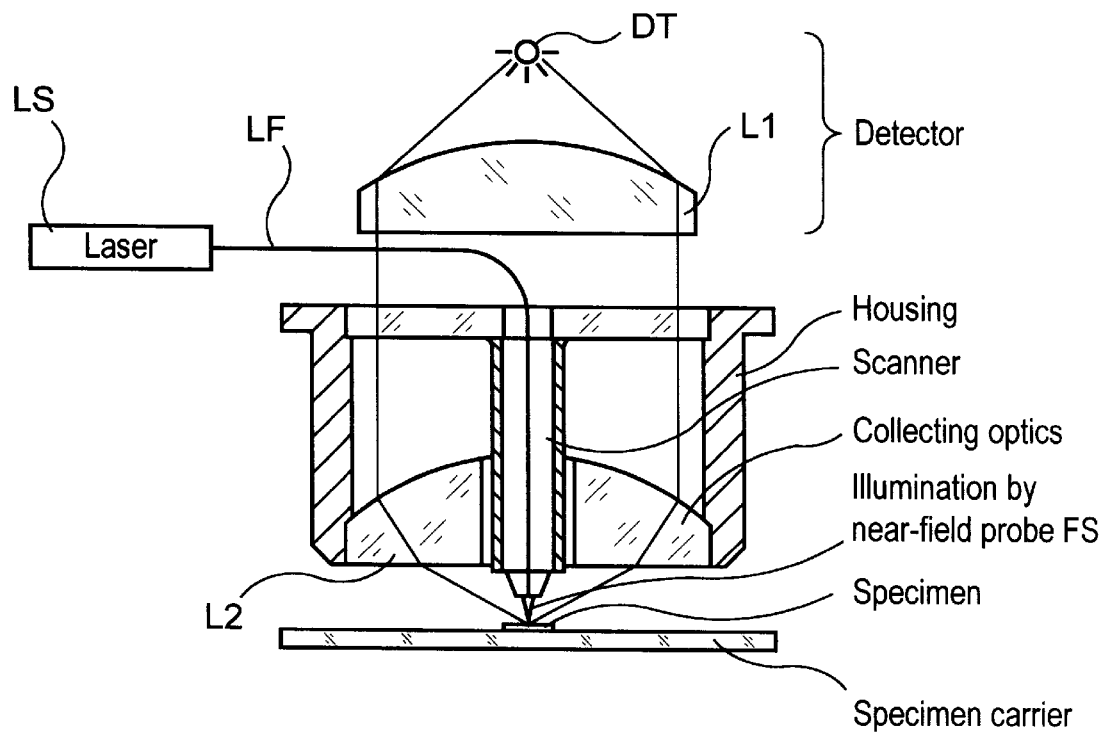
F I G. 3
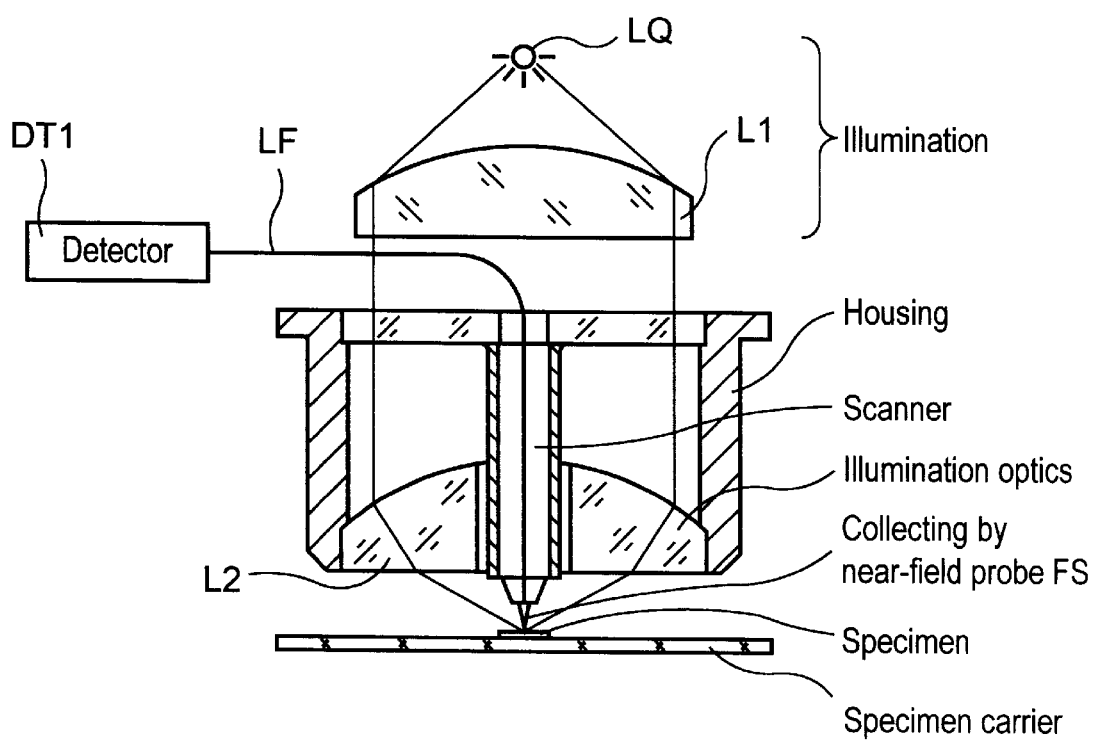
F I G. 4

SCANNING PROBE MICROSCOPE WITH PROBE INTEGRATED IN AN OPTICAL SYSTEM

BACKGROUND OF THE INVENTION a) Field of the Invention

The invention describes a probe scanning microscope in which the probe is integrated in an optical system. In one embodiment form, the probe is attached to a scanner which is integrated in the optical system. In another embodiment form, the specimen is moved.

b) Description of the Related Art

The optical system in question corresponds to a conventional illumination condenser for an optical light microscope.

SUMMARY OF THE INVENTION

The invention is directed to an illumination device for a light microscope wherein a scanning probe microscope probe is integrated in the center thereof. Further, the invention encompasses a scanning probe microscope with an illumination device of the above type.

BRIEF DESCRIPTION OF THE DRAWINGS

In the drawings:

FIG. 3 shows an arrangement as in FIG. 1 but in the reflection mode; and

FIG. 4 shows another embodiment of a reflection SNOM.

Using the conventional optical system, this optical system is drilled through in the center. The probe and, as the case maybe, the scanner are integrated in this bore hole. It has been demonstrated that the illumination characteristics and light collecting characteristics of the optical system are changed only unsubstantially by these modifications.

Figure 1:
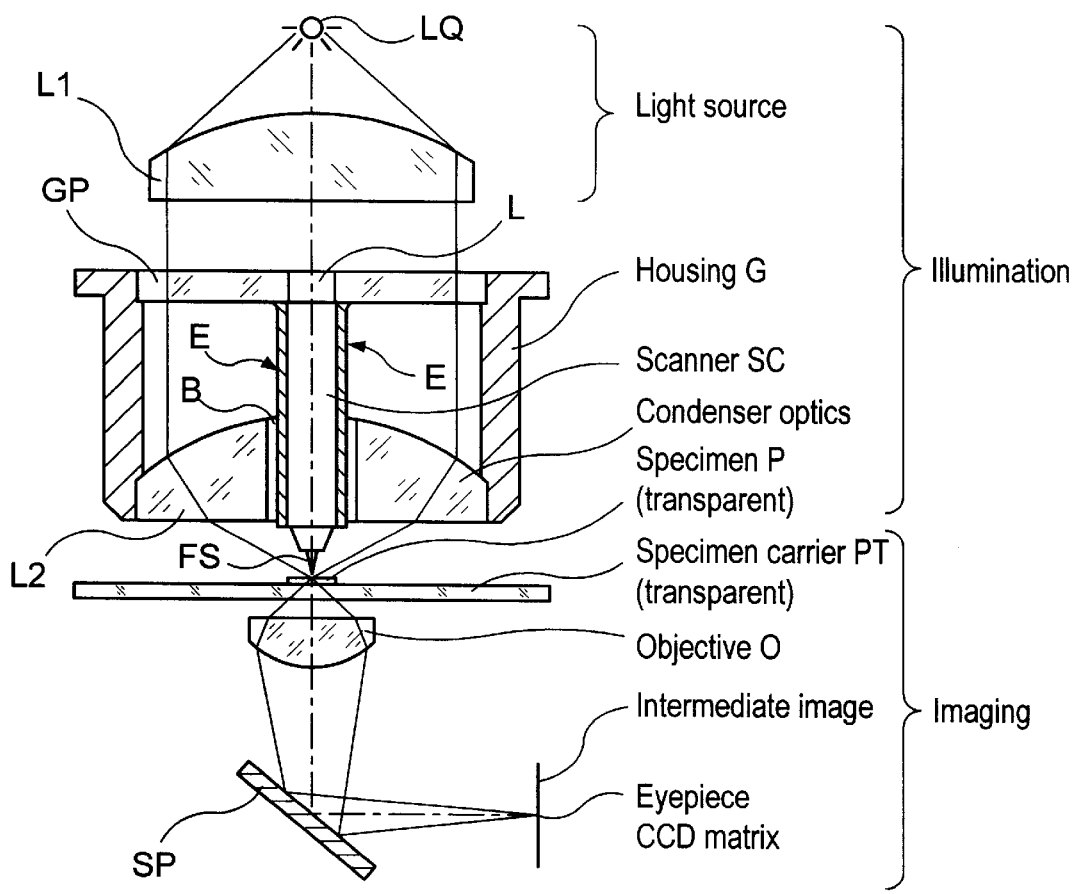
FIG. 1 shows in schematic form an illumination condenser with integrated scanning probe microscope in the transmitted-light mode.
Figure 2:
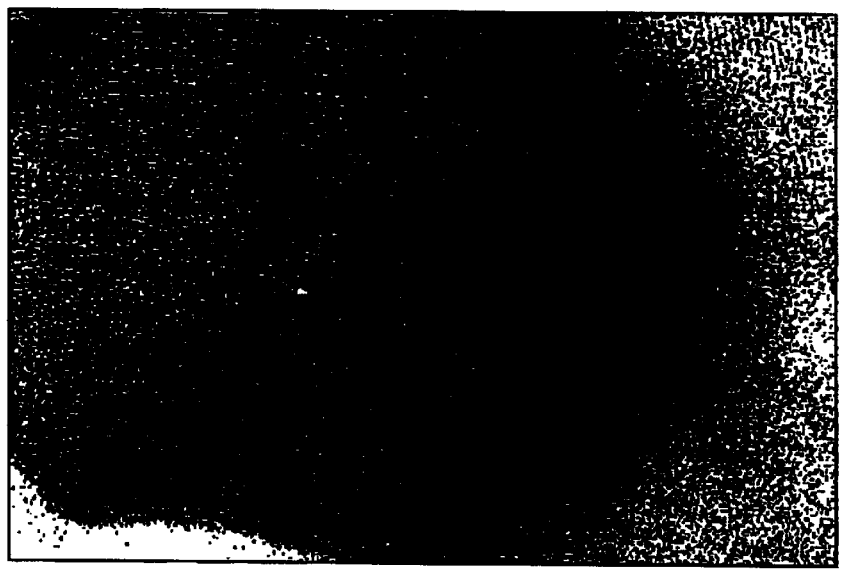
FIG. 2 illustrates the recording of a light-microscope imaging of the specimen and the SNOM probe.

The above construction can be used for various tasks:

1) When operating a scanning probe microscope it is advantageous when the specimen can be observed in parallel with a conventional light microscope at the location at which it is scanned by the probe (FIG. 2). Optimum illumination of the specimen is a prerequisite for making use of the full capabilities of a light microscope. For this purpose, the literature describes various constructions in which the probe is integrated in an objective and the specimen is illuminated by the objective (EP 509856). This construction has various disadvantages. It is not possible to examine the specimen in transmission mode as is conventional in biology. When installed in an objective, the imaging characteristics are substantially worsened and it is not possible to change the objective. In the proposed construction (see FIG. 1), standard objectives can be used without restriction. The transmitted-light condenser that is normally used is replaced by a construction according to the invention.

2) A SNOM can be operated in reflection mode (FIG. 3). In reflection mode, the illumination of the specimen and the collection of the reflected light are carried out from the same side. In one type of construction, the specimen is illuminated by the probe. The specimen reflects the light or is excited by light for emission. This light must be collected in the far field with high efficiency. For this purpose, the optical system must have the highest possible aperture and must completely enclose the probe radially. This object can be met through the invention in an ideal manner.

3) In another operating mode of a reflection SNOM (FIG. 4), the specimen is illuminated by a far-field optical system and the SNOM probe collects the light in the near field. In this case, the illumination must be carried out in the most effective manner possible and, as far as possible, only in the region of the probe. This object can be met through the invention in an ideal manner.

DESCRIPTION OF THE PREFERRED EMBODIMENTS

FIG. 1 shows schematically an illumination condenser with integrated scanning probe microscope in the transmitted-light mode. The diagram shows the construction of the condenser inside an inverse microscope. The illumination optics comprising lens L1 for expansion of the light of a light source LQ and lens L2 for collection of the illumination light on the specimen P arranged on a transparent specimen carrier PT is shown only schematically and can also comprise a lens combination corresponding to the construction of a light-microscope illumination condenser.

At least lens L2 is located in a housing G which has, at its upper side, a light-transparent closure in the form of a glass plate GP. The glass plate has a hole L in the center into which a light-conducting fiber can be inserted as is shown in FIGS. 3 and 4.

Lens L2 has a bore hole B in the center, in which can be accommodated a cylindrical scanner SC which can be driven by means of electrodes E for the scanning movement of a fiber tip of a near-field probe FS.

The fiber tip can be a drawn glass fiber, but can also be a near-field probe, according to EP 818699 A1, with a tip arranged on an optical waveguide.

Located on the underside of the specimen carrier is the objective O of the inverse microscope which an intermediate image of the observed specimen via a mirror SP in the direction of the eyepiece, not shown, or a camera arranged at the location of the intermediate image or an optically conjugated position of the intermediate image generated by transmission optics, for example, a CCD matrix.

FIG. 2 shows the recording of a light-microscope imaging of the specimen and the SNOM probe. The illumination is carried out by a construction corresponding to the invention. (Objective: 100×, NA 1.3/oil, SNOM condenser: 0.5–0.8 bright field).

FIG. 3 shows an arrangement according to the invention, described in FIG. 1, in reflection mode. The specimen is illuminated by the near-field probe in that the light of an external laser LS is transmitted via a light-conducting fiber LF into the tip of the near-field probe FS. The light is either reflected or excites the specimen to emission (e.g., by fluorescence). In this case, the light is collected through the light collecting optics L1, L2 according to the invention and reaches a detector DT which is arranged in place of the light source in FIG. 1.

FIG. 4 shows another construction of a reflection SNOM. The specimen is illuminated by the illumination optics according to the invention as in FIG. 1. The light is either reflected or excites the specimen to emission (e.g., through fluorescence). The light is collected through the near-field probe FS and conducted to a photodetector DT1 (e.g., avalanche photodiode) via a light-conducting fiber LF.

The area of the specimen P comprehended by the illumination optics L1, L2 can advantageously be varied, either by exchanging the lenses or lens groups L1, L2 or by using variable optics. In this way, when the specimen is illuminated via L1, L2, the loading of the specimen by the illumination light can be optimized and scattered light can be prevented in an optimum manner with respect to the light detection via L1, L2. The construction according to the invention can advantageously be applied in an all-purpose manner for different microscopic observation and evaluation processes.

The embodiment form shown in FIG. 1 is suitable for combining any scanning probe microscope with a conventional light microscope with transmitted-light illumination. The advantage for the user consists in that the desired specimen sites which the user wants to examine by the scanning probe microscope with high resolution can be located by the user beforehand in a simple and fast manner with the light microscope.

The embodiment forms shown in FIGS. 3 and 4 are particularly advantageous constructions of a snom with a nearfield-optical SNOM probe.

While the foregoing description and drawings represent the present invention, it will be obvious to those skilled in the art that various changes may be made therein without departing from the true spirit and scope of the present invention.

What is claimed is:

1. An illumination device for a scanning near-field optical microscope (SNOM), comprising:
    an optical system having at least one lens;
    said at least one lens having a center; and
    a SNOM probe being located in said center of said at least one lens and being mounted at a scanner, wherein said at least one lens is used to collect light that is reflected back from a specimen illuminated by the SNOM probe.

2. An illumination device for a scanning near-field optical microscope (SNOM), comprising:
    an optical system having at least one lens;
    said at least one lens having a center; and
    a SNOM probe being located in said center of said at least one lens;
    wherein said at least one lens is used to collect light that is emitted by the specimen illuminated by the SNOM probe.

3. An illumination device for a scanning near-field optical microscope (SNOM), comprising:
    an optical system having at least one lens;
    said at least one lens having a center; and
    a SNOM probe being located in said center of said at least one lens;
    wherein illumination of a transparent specimen is carried out by said at least one lens and the probe, and a microscope objective is arranged on the other side of said transparent specimen.

4. An illumination device for a scanning near-field optical microscope (SNOM), comprising:
    a housing;
    an exchangeable lens coupled to the housing, the lens having a center; and
    a SNOM probe located in the center of the lens to provide illumination of a specimen, wherein the lens receives light originating from the specimen in response to illumination by the SNOM probe.

5. An illumination device for a scanning near-field optical microscope (SNOM), comprising:
    a housing;
    an exchangeable lens coupled to the housing, the lens having a center; and
    a SNOM probe located in the center of the lens, wherein both the lens and the SNOM probe provide illumination of a transparent specimen and a microscope objective is disposed to receive light passing through the transparent specimen.

* * * * *